United States Patent
Sangap Venugopal Naidu et al.

(10) Patent No.: US 12,467,975 B2
(45) Date of Patent: Nov. 11, 2025

(54) GENERATING A LIGHTING SYSTEM ANALYSIS

(71) Applicant: Honeywell International Inc., Charlotte, NC (US)

(72) Inventors: Sreekanth Sangap Venugopal Naidu, Bengaluru (IN); James Llewellyn van Brampton, Krefeld (DE); Vipin Das E K, Bengaluru (IN); Rajesh Babu Nalukurthy, Atlanta, GA (US)

(73) Assignee: Honeywell International Inc., Charlotte, NC (US)

( * ) Notice: Subject to any disclaimer, the term of this patent is extended or adjusted under 35 U.S.C. 154(b) by 73 days.

(21) Appl. No.: 18/118,289

(22) Filed: Mar. 7, 2023

(65) Prior Publication Data
US 2024/0306282 A1    Sep. 12, 2024

(51) Int. Cl.
*G01R 31/36* (2020.01)
*G01R 31/387* (2019.01)
*H05B 47/14* (2020.01)

(52) U.S. Cl.
CPC ......... *G01R 31/36* (2013.01); *G01R 31/3646* (2019.01); *G01R 31/387* (2019.01); *H05B 47/14* (2020.01)

(58) Field of Classification Search
CPC . G08B 7/00; G08B 7/06; G08B 29/00; G08B 29/02; H05B 37/00; H05B 37/02; H05B 37/0227; H05B 47/00; H05B 47/10; H05B 47/105; H05B 47/14; H05N 37/0245; F21S 2/00; F21S 9/02; F21S 8/00; F21S 8/033; G01R 31/36; G01R 31/3646; G01R 31/3648
See application file for complete search history.

(56) References Cited

U.S. PATENT DOCUMENTS

2008/0266076 A1   10/2008   Barrieau et al.
2012/0262093 A1*  10/2012   Recker .............. H05B 47/16
                                                    315/307
(Continued)

FOREIGN PATENT DOCUMENTS

CN    211321580 U    8/2020
EP    3435743 A1     1/2019
(Continued)

OTHER PUBLICATIONS

Xu, et al., "The Design, Implementation, and Deployment of a Smart Lighting System for Smart Buildings"; IEEE Internet of Things Journal, vol. 6, No. 4, Aug. 2019 (16 pgs).
(Continued)

*Primary Examiner* — Van T Trieu
(74) *Attorney, Agent, or Firm* — Brooks, Cameron & Huebsch, PLLC

(57) ABSTRACT

Devices, systems, and methods for generating a lighting system analysis are described herein. In some examples, one or more embodiments include a computing device comprising a memory and a processor to execute instructions stored in the memory to connect to a lighting device of an emergency lighting system of a facility, retrieve lighting information about the lighting device, and generate a lighting system analysis for the lighting device based on the retrieved lighting information.

17 Claims, 4 Drawing Sheets

(56) References Cited

U.S. PATENT DOCUMENTS

| | | | | |
|---|---|---|---|---|
| 2015/0145421 A1* | 5/2015 | Chung | ............. | H05B 47/175 |
| | | | | 315/158 |
| 2020/0027321 A1* | 1/2020 | Poirier | ............. | G08B 29/02 |
| 2020/0103465 A1* | 4/2020 | Heilman | ............. | H02J 9/065 |
| 2021/0050746 A1* | 2/2021 | Malan | ............. | H02J 7/0048 |

FOREIGN PATENT DOCUMENTS

| | | |
|---|---|---|
| EP | 3771155 A1 | 1/2021 |
| RU | 2752423 C2 | 7/2021 |

OTHER PUBLICATIONS

Teknoware: Design Guide for Emergency Lighting Systems—Emergency Lightening: Highlighting Safely (Accessed: Jan. 30, 2023; 20 pgs) https://www.teknoware.com/sites/default/files/Emergency-Downloads/teknoware_emergency_lighting_design_guide.pdf.

* cited by examiner

GENERATING A LIGHTING SYSTEM ANALYSIS

TECHNICAL FIELD

The present disclosure relates to devices, systems, and methods for generating a lighting system analysis.

BACKGROUND

Facilities, such as commercial facilities, office buildings, hospitals, campuses (e.g., including buildings and outdoor spaces), and the like, may have an event system that can be triggered during an event, such as an emergency situation (e.g., a fire, a security event, etc.). Such an event system may include a control panel (e.g., a lighting control panel, a fire control panel, an alarm system control panel, etc.) and a number of devices (e.g., lighting devices, event devices, etc.) located throughout the facility (e.g., on different floors and/or in different rooms of the facility) that can perform an action when an event is occurring in the facility and provide a notification of the event to the occupants of the facility via alarms or other mechanisms.

DETAILED DESCRIPTION

Figure 1:
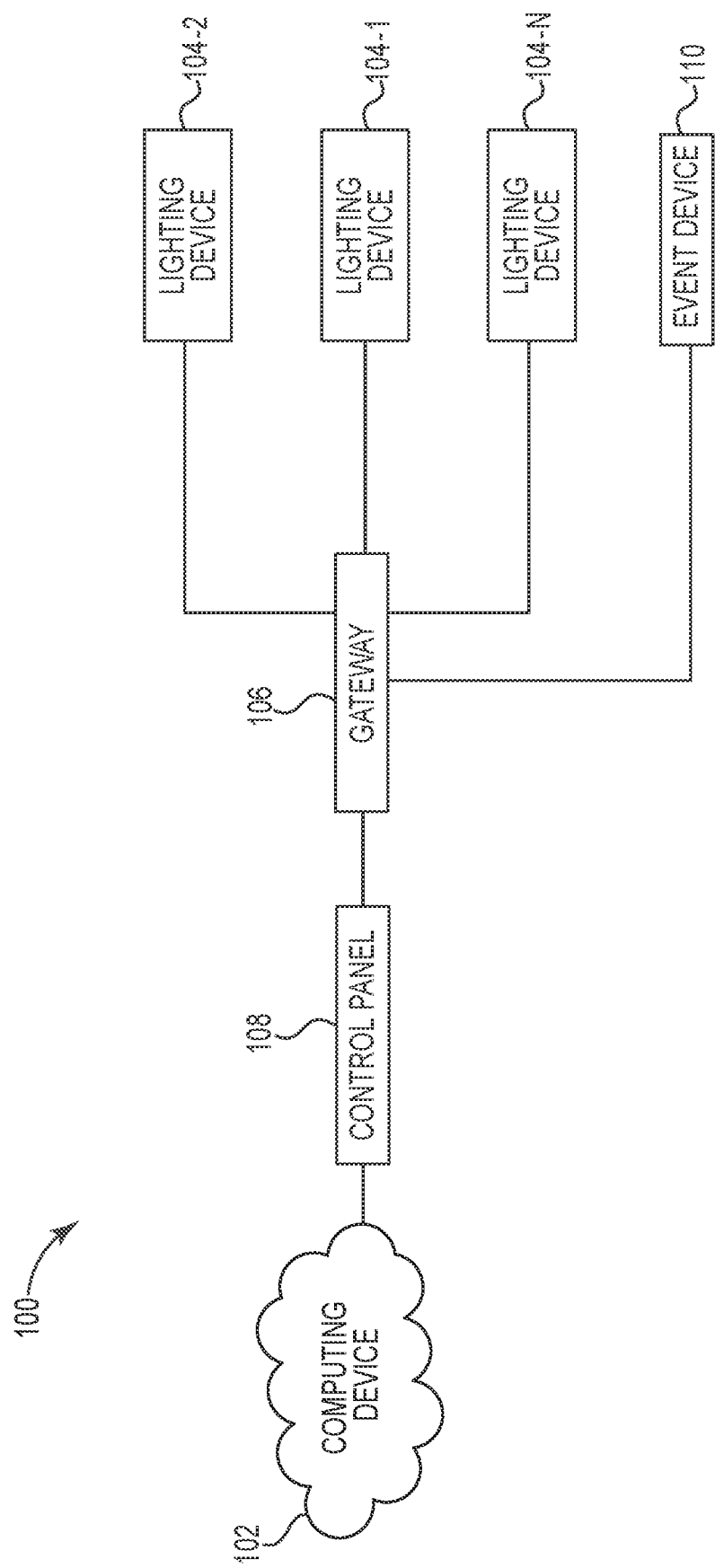
FIG. 1 is an example of a system for generating a lighting system analysis, in accordance with one or more embodiments of the present disclosure.

Devices, systems, and methods for generating a lighting system analysis are described herein. In some examples, one or more embodiments include a computing device device comprising a memory and a processor to execute instructions stored in the memory to connect to a lighting device of an emergency lighting system of a facility, retrieve lighting information about the lighting device, and generate a lighting system analysis for the lighting device based on the retrieved lighting information.

A facility can utilize an event system in order to warn occupants of the facility of an emergency event, such as a fire, security event, etc. As used herein, the term "event system" refers to a system of devices to provide an audible and/or visible warning in an emergency event. For example, the event system can utilize event devices and/or lighting devices to warn occupants of the event occurring in the space, such as a fire, security event, etc. As used herein, the term "lighting device" refers to a device that can emit a visual indicator. As used herein, the term "event device" refers to a device that can receive an input relating to an event and/or generate an output relating to an event. Such lighting devices and event devices can be a part of the event system of a space in a facility/in the facility at large. Event devices can include devices such as fire sensors, smoke detectors, heat detectors, carbon monoxide (CO) detectors, or combinations of these; motion detectors; entry sensors (e.g., door sensors, window sensors, glass break sensors, shock/vibration sensors, etc.); interfaces; manual call points (MCPs); pull stations; input/output modules; aspirating units; and/or other audio/visual devices (e.g., speakers, sounders, flashers, buzzers, microphones, cameras, video displays, video screens, etc.), and/or relay output modules, among other types of event devices.

An emergency lighting system may be utilized in conjunction with other devices in an event system, such as fire devices. The emergency lighting system may be utilized to illuminate areas in the facility when an event occurs. For example, if a fire occurs in the facility that interrupts normal electrical mains supply to a main lighting system in the facility, an emergency lighting system may be activated to illuminate areas of the facility. Such illumination can assist with evacuation of occupants of the facility, help emergency responders (e.g., fire fighters) navigate the facility and locate areas in the facility (e.g., a location of the event that is occurring, such as a fire), etc.

In an event in which normal electrical mains supply to the emergency lighting is also interrupted, the emergency lighting system may utilize charge storage devices located in each lighting device. These charge storage devices can ensure that a lamp of the lighting device can be illuminated in an emergency event, even if the normal electrical mains supply to the lighting devices is interrupted.

Maintenance of the lighting devices in an emergency lighting system in a facility can be a time consuming and expensive task. For example, a user may have to individually retrieve and check each charge storage device of each lighting device to ensure the lighting device and its components are working properly so that they function if an emergency event occurs.

Generating a lighting system analysis, according to the present disclosure, can allow for a computing device to easily connect to and retrieve lighting information from each lighting device in a facility. The lighting information can be utilized to generate a lighting system analysis for the lighting devices in a facility, which can include a report about the lighting devices. Such a report can include a status of the lighting devices, including charge state of charge storage devices of the lighting devices, life remaining in the charge storage devices, number of lighting devices operating normally, number of lighting devices having a fault, type of maintenance to be performed on which lighting devices, among other information as is further described herein. Such an approach can allow for more efficient and less costly maintenance process for an emergency lighting system in the facility, as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of a system 100 for generating a lighting system analysis, in accordance with one or more embodiments of the present disclosure. The system 100 can include a computing device 102, lighting devices 104-1, 104-2, 104-N, a gateway 106, a control panel 108, and an event device 110.

As mentioned above, the system 100 can be included in a facility, a space in a facility, etc. The system 100 can include an event system. The event system can include a device/series of devices in order to detect events and/or process and/or analyze the detected events to determine whether to generate an alarm for occupants of the facility.

In some examples, such devices to detect events can include lighting devices 104-1, 104-2, 104-N. Such lighting devices 104-1, 104-2, 104-N can be devices that can emit a visual indicator. Lighting devices 104-1, 104-2, 104-N can be, for example, a variety of devices including bulkhead fittings, fire signage, emergency downlights (e.g., light emitting diode (LED) emergency lights), exit signs, egress pathway lights, standby lights, and/or combinations thereof, and can include a charge storage device and a lamp, as is further described in connection with FIG. 2. Such lighting devices 104-1, 104-2, 104-N can be directly connected to a main electrical supply of the facility and/or include a separate power source (e.g., a charge storage device) which can guarantee emission of a visual indicator (e.g., light) via a lamp even when the main electrical supply is interrupted, as is further described in connection with FIG. 2.

In some examples, such devices to detect events can include an event device 110. For example, the event device 110 can be a device to detect events and/or process and/or analyze the detected events. As mentioned above, the event device 110 can be, for example, a variety of devices including fire sensors, smoke detectors, heat detectors, carbon monoxide (CO) detectors, or combinations of these; motion detectors; entry sensors (e.g., door sensors, window sensors, glass break sensors, shock/vibration sensors, etc.); interfaces; manual call points (MCPs); pull stations; input/output modules; aspirating units; and/or audio/visual devices (e.g., speakers, sounders, flashers, buzzers, microphones, cameras, video displays, video screens, etc.), and/or relay output modules, among other types of event devices.

Although the system 100 is illustrated as including a single event device 110, embodiments of the present disclosure are not so limited. For example, the system 100 can include multiple event devices 110.

The system 100 can include a control panel 108. The control panel 108 can be utilized to control the various lighting devices 104-1, 104-2, 104-N and/or the event device 110 included in the system 100.

The control panel 108 can be connected to the lighting devices 104 and event device 110. For example, the control panel 108 may be connected to the lighting devices 104 and event device 110 via gateway 106. The gateway 106 can be a device (e.g., a building system gateway) that provides a communication link between the control panel 108 and lighting devices 104 and event device 110, as well as any peripheral devices that may be included in the system 100 (e.g., not illustrated in FIG. 1). For example, the gateway 106 can enable transmission of data (e.g., system device data, activation signals, etc.) from the control panel 108 to the lighting devices 104 and event device 110 and transmission of data from the lighting devices 104 and event device 110 to the control panel 108.

The computing device 102 can be connected to the lighting devices 104-1, 104-2, 104-N and event device 110 via the control panel 108 and gateway 106. For example, the computing device 102 can connect, via the gateway 106, to a lighting device 104-1 of the emergency lighting system of the facility. The computing device 102 can connect to the lighting device 104-1 (e.g., and/or any other lighting device 104-2, 104-N and/or the event device 110) by connecting to the gateway 106.

In some examples, the computing device 102 can communicate with the gateway 106 via an RS-232 communication standard. For instance, the computing device 102 can communicate with the gateway 106 via serial communication transmission of data via the RS-232 communication standard.

In some examples, the computing device 102 can communicate with the gateway 106 via an RS-485 communication standard. For instance, the computing device 102 can communicate with the gateway 106 via serial communication transmission of data via the RS-485 communication standard.

While the computing device 102 is described above as communicating with the gateway 106 via an RS-232 or an RS-485 communication standard, embodiments of the present disclosure are not so limited. For example, the computing device 102 can communicate with the gateway 106 via any other communication standard via a wired and/or wireless network relationship. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

When connected, the computing device 102 can retrieve lighting information about the lighting device 104-1, 104-2, 104-N. For example, the computing device 102 can retrieve lighting information from one of or each of the lighting devices 104-1, 104-2, 104-N by communicating with the lighting devices 104-1, 104-2, 104-N via the gateway 106.

Retrieval of the lighting information by the computing device 102 can be performed according to a predetermined schedule. For example, the computing device 102 can retrieve lighting information from the lighting devices 104-1, 104-2, 104-N once per hour, once per day, once per week, and/or any other frequency per interval, etc. Such a predetermined schedule can be determined based on local jurisdictional requirements of the facility (e.g., according to code), determined based on life of the lighting devices 104-1, 104-2, 104-N (e.g., older lighting devices may be checked more frequently than newer lighting devices), and/or based on any other considerations.

Although the computing device 102 is described above as retrieving the lighting information according to a predetermined schedule, embodiments of the present disclosure are not so limited. For example, the computing device 102 may retrieve the lighting information from the lighting devices 104-1, 104-2, 104-N in response to a user input to the computing device 102. For instance, a facility manager may request lighting information be retrieved outside of a predetermined schedule by providing an input to the computing device 102 to retrieve the lighting information.

The lighting information can include a charge state of a charge storage device of a lighting device 104-1, 104-2, 104-N. For example, the computing device 102 can retrieve the charge state of a charge storage device of lighting device 104-1. The charge state can be a level of charge of a charge storage device relative to its capacity. For example, the charge state of a charge storage device of lighting device 104-1 may be retrieved and determined by the computing device 102 to be 95%. As another example, the charge state of a charge storage device of lighting device 104-2 may be retrieved and determined by the computing device 102 to be 73%.

The computing device 102 can compare the charge state of the charge storage device to a threshold charge amount. For example, the computing device 102 can compare the charge state (e.g., 95%) of the charge storage device of lighting device 104-1 to a threshold charge amount (e.g., 90%) and the charge state (e.g., 73%) of the charge storage device of lighting device 104-2 to the threshold charge amount (e.g., 90%).

Based on the comparison, the computing device 102 can determine whether the lighting device 104-1, 104-2, 104-N has a fault. For instance, in response to the charge state being less than the threshold charge amount, the computing device 102 can determine a particular lighting device 104-1, 104-2, 104-N has a fault. For example, based on the charge state (e.g., 73%) of the charge storage device of lighting device 104-2 being less than the threshold charge amount (e.g., 90%), the computing device 102 can determine that the lighting device 104-2 has a fault.

Such a fault may include the charge storage device having a capacity loss (e.g., the amount of charge a battery can deliver at a rated voltage has decreased with time and/or use). Such a capacity loss can correspond to an amount of life remaining in the charge storage device (e.g., battery life remaining). For instance, in some examples, the capacity loss can be determined from the charge state. Accordingly, in response to the capacity loss exceeding a threshold loss amount, the computing device 102 can determine that the charge storage device and/or the lighting device 104 should be replaced.

Although the fault is described above as capacity loss, embodiments of the present disclosure are not so limited. For example, such a fault may include the charge storage device is not being charged properly, the charge storage device has a manufacturing fault, etc.

As described above, the computing device 102 can determine that the lighting device 104-2 has a fault based on a comparison of the charge state of a charge storage device of the lighting device 104-2 being less than a threshold charge amount. However, the computing device 102 can determine that a lighting device does not have a fault. For example, based on the charge state (e.g., 95%) of the charge storage device of lighting device 104-1 being greater than or equal to the threshold charge amount (e.g., 90%), the computing device 102 can determine that the lighting device 104-1 does not has a fault and is working as intended.

In some examples, the computing device 102 can retrieve the lighting information from the lighting devices 104-1, 104-2, 104-N during a test mode of the lighting devices 104-1, 104-2, 104-N. For example, during a test mode, power mains to the lighting devices 104-1, 104-2, 104-N can be intentionally interrupted (e.g., shut off), causing the charge storage devices of the respective lighting devices 104-1, 104-2, 104-N to provide power to the lamps of the respective lighting devices 104-1, 104-2, 104-N. The computing device 102 can, in some instances, retrieve the lighting information from the lighting devices 104-1, 104-2, 104-N during this test mode.

Based on the retrieved lighting information, the computing device 102 can generate a lighting system analysis for the lighting devices 104-1, 104-2, 104-N. The lighting system analysis can include information for a user to review for potential action items with respect to the lighting devices 104-1, 104-2, 104-N. In some examples, the lighting system analysis can be generated to indicate a charge storage device of the lighting device 104-2 has a fault in response to the charge state being less than the threshold charge amount, and a user of the computing device 102 (e.g., a facility manager or other user) can generate a work order to fix and/or replace the charge storage device of the lighting device 104-2, and/or replace the lighting device 104-2 altogether, among other types of actions. For example, the lighting system analysis can include (e.g., in a report) that the charge storage device of the lighting device 104-2 has had a capacity loss that exceeds a threshold amount (e.g., the battery life remaining is below a threshold) and that the charge storage device should be replaced. As another example, the lighting system analysis can be generated to indicate a charge storage device of the lighting device 104-1 does not have a fault and is operating normally in response to the charge state being greater than the threshold charge amount. As such, such information can be utilized to efficiently check operational status of the lighting devices 104-1, 104-2, 104-N in the facility.

Accordingly, in a situation in which the event device 110 detects an event occurring in the facility (e.g., a fire), the control panel 108 enables the lamps of the lighting devices 104-1, 104-2, and/or 104-N (e.g., via the gateway 106). Such lamps can be known to be functioning as intended based on the lighting system analysis in order to safely guide occupants out of the facility and/or safely guide first responders to the location of the event.

Figure 2:
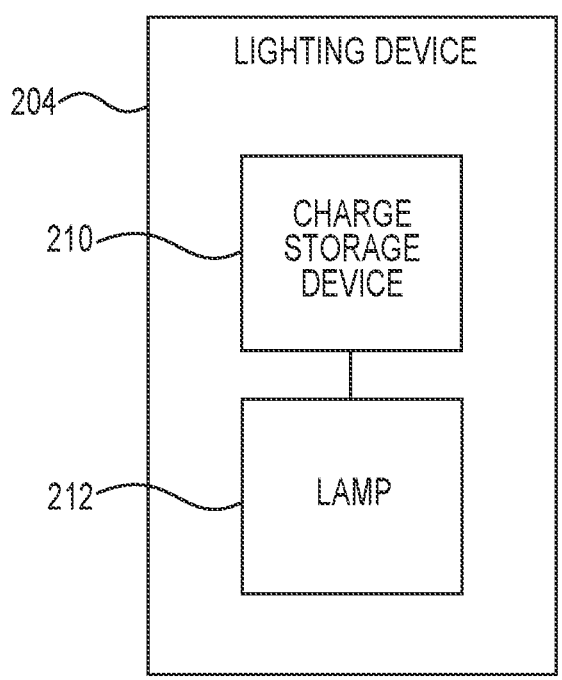
FIG. 2 is an example of a lighting device for generating a lighting system analysis, in accordance with one or more embodiments of the present disclosure.

FIG. 2 is an example of a lighting device 204 for generating a lighting system analysis, in accordance with one or more embodiments of the present disclosure. The lighting device 204 can include a charge storage device 210 and a lamp 212.

As illustrated in FIG. 2, the lighting device 204 can include a charge storage device 210. Such a charge storage device 210 can be a battery that can be charged by a main electrical supply of the facility (e.g., not illustrated in FIG. 2). In an event in which the main electrical supply of the facility is interrupted, the charge storage device 210 can power the lamp 212 such that the lamp 212 can illuminate to emit a visual indicator. The lamp 212 can be an incandescent lamp, a halogen incandescent lamp, a fluorescent lamp, compact fluorescent lamp, LED, etc.

As previously mentioned in FIG. 1, the lighting device 204 can emit a visual indicator via the lamp 212. The lighting device 204 can be, for example, a variety of different devices to emit a visual indicator, such as bulkhead fittings, fire signage, emergency downlights (e.g., LED emergency lights), exit signs, egress pathway lights, standby lights, and/or combinations thereof. Such devices can be thermoplastic, self-luminous, photoluminescent, and/or edge lit devices, among other types of devices in order to safely guide occupants out of a facility and/or safely guide first responders to a location of an event in the facility.

Figure 3:
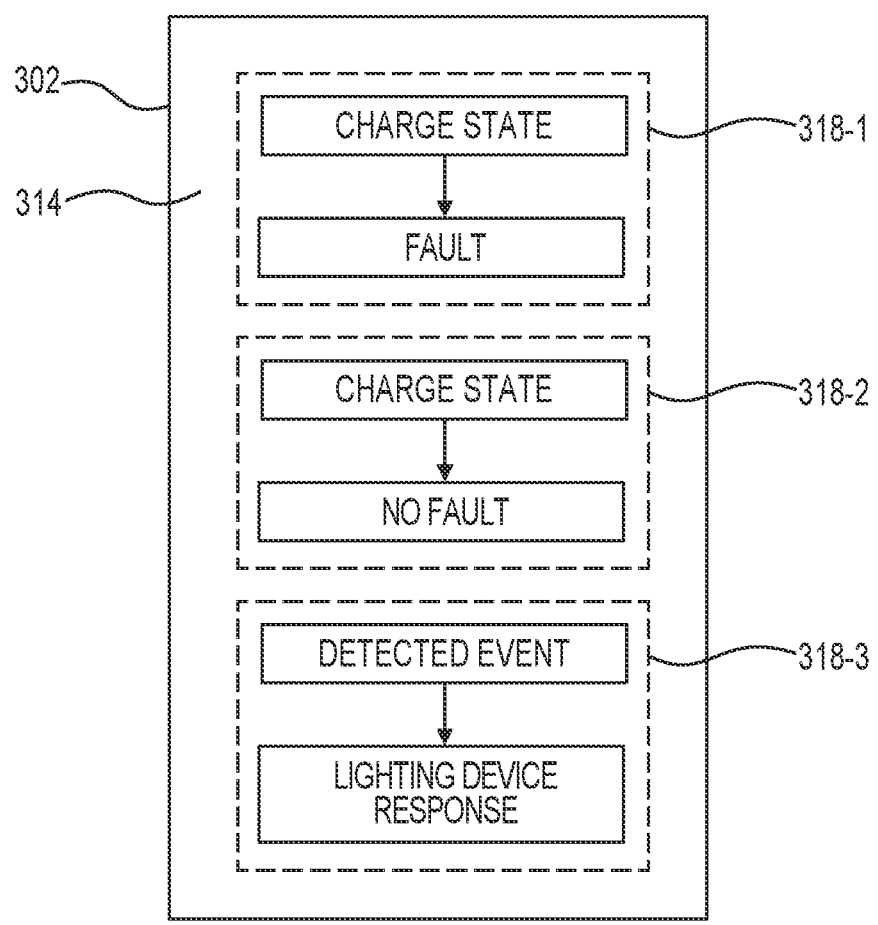
FIG. 3 is an example of a display of a computing device displaying a report for a lighting system analysis, in accordance with one or more embodiments of the present disclosure.

FIG. 3 is an example of a display 314 of a computing device 302 displaying a report 318 for a lighting system analysis, in accordance with one or more embodiments of the present disclosure. The display 314 can display a report 318-1 about a lighting device having a fault, a report 318-2 having a lighting device without a fault, and/or a report 318-3 describing a detected event and a response of a lighting device, as is further described herein.

As previously described above, the computing device 302 can generate a lighting system analysis for a lighting device based on retrieved lighting information. Generation of the lighting system analysis can include generating a report 318. The report in the lighting system analysis can include information for a user to review for potential action items with respect to a lighting device.

For example, the lighting system analysis can be generated to include a report 318-1 to indicate a charge storage device of a lighting device has a fault in response to the charge state of the charge storage device of the lighting device being less than the threshold charge amount, and a user of the computing device 302 (e.g., a facility manager or other user) can generate a work order to fix and/or replace the charge storage device of the lighting device, and/or replace the lighting device altogether, among other types of actions. As another example, the lighting system analysis can be generated to include a report 318-2 to indicate a charge storage device of the lighting device does not have a fault and is operating normally in response to the charge state being greater than the threshold charge amount. As such, such information can be utilized to efficiently check operational status of the lighting devices in the facility.

As previously described in connection with FIG. 1, in some examples, an event device in the facility may detect an event. For example, a smoke detector may detect smoke, and in response, a lighting device may be enabled by a control panel of the facility. The report 318-3 can be generated to indicate the detected event (e.g., smoke detection) by the particular event device, as well as the lighting device response (e.g., the lighting device was illuminated). In an example in which the lighting device response did not illuminate, the report 318-3 may indicate the lighting device did not operate as intended.

Although the reports 318-1, 318-2, 318-3 are described above as including a charge storage device has a fault, a charge storage device does not have a fault, and/or a detected event (respectively), embodiments of the present disclosure are not so limited. For example, the report can be generated to include summary information of lighting devices in the facility. For example, the report can include a charge state of charge storage devices of some or all of the lighting devices in the facility, an amount of life remaining in charge storage devices of some or all of the lighting devices in the facility, whether maintenance is to be performed for some or all of the lighting devices in the facility, whether any of the lighting devices in the facility include a fault, lighting devices in the facility that do not include a fault (e.g., are operating normally) etc.

Accordingly, generating a lighting system analysis can allow for a computing device to retrieve lighting information from lighting devices in a facility via a gateway and generate a lighting system analysis. Such information can be retrieved remotely. Such analysis can include reports for which a user can easily review to more efficiently perform maintenance review of lighting devices in an emergency lighting system in a facility, as compared with previous approaches. Such an approach can allow for a quick review of lighting devices in a facility for a user via the report illustrating a current status of the lighting devices (e.g., charge state, life remaining, number of lighting devices operating normally, number of lighting devices having a fault, type of maintenance required for a particular lighting device, etc.) Accordingly, the report can allow for remote as well as more efficient monitoring and/or control of a lighting system, as compared with previous approaches.

Figure 4:
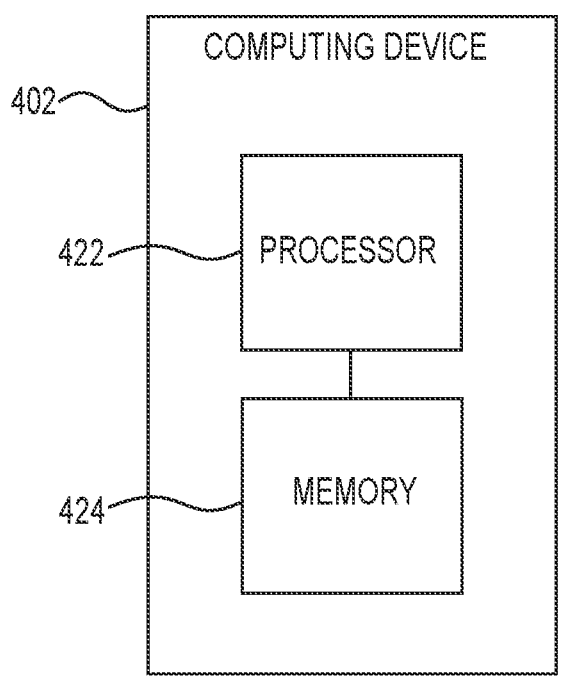
FIG. 4 is an example of a computing device for generating a lighting system analysis, in accordance with one or more embodiments of the present disclosure.

FIG. 4 is an example of a computing device 402 for generating a lighting system analysis, in accordance with one or more embodiments of the present disclosure. As illustrated in FIG. 4, the computing device 402 can include a memory 424 and a processor 422 for generating a lighting system analysis, in accordance with the present disclosure.

The memory 424 can be any type of storage medium that can be accessed by the processor 422 to perform various examples of the present disclosure. For example, the memory 424 can be a non-transitory computer readable medium having computer readable instructions (e.g., executable instructions/computer program instructions) stored thereon that are executable by the processor 422 for generating a lighting system analysis in accordance with the present disclosure.

The memory 424 can be volatile or nonvolatile memory. The memory 424 can also be removable (e.g., portable) memory, or non-removable (e.g., internal) memory. For example, the memory 424 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 424 is illustrated as being located within computing device 402, embodiments of the present disclosure are not so limited. For example, memory 424 can also be located internal to another computing resource (e.g., enabling computer readable instructions to be downloaded over the Internet or another wired or wireless connection).

The processor 422 may be a central processing unit (CPU), a semiconductor-based microprocessor, and/or other hardware devices suitable for retrieval and execution of machine-readable instructions stored in the memory 424.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for generating a lighting system analysis, comprising:
   a non-transitory memory; and
   a processor configured to execute executable instructions stored in the non-transitory memory to:
      connect to a lighting device of an emergency lighting system of a facility, wherein the computing device is remotely located from the lighting device;
      retrieve lighting information about the lighting device including a charge state of a charge storage device of the lighting device, wherein the charge state is a level of charge of the charge storage device relative to a capacity of the charge storage device, and wherein the lighting information is retrieved according to a predetermined schedule that is based on a jurisdictional requirement of the facility;
      determine, based on the charge state of the charge storage device, a capacity loss of the charge storage device;
      determine, based on the capacity loss, an amount of life remaining in the charge storage device; and
      generate a lighting system analysis for the lighting device based on the retrieved lighting information, wherein the lighting system analysis includes:
         the charge state of the charge storage device; and
         the amount of life remaining in the charge storage device.

2. The computing device of claim 1, wherein the processor is configured to compare the charge state of the charge storage device to a threshold charge amount.

3. The computing device of claim 2, wherein the processor is configured to generate the lighting system analysis indicating the charge storage device has a fault in response to the charge state being less than the threshold charge amount.

4. The computing device of claim 2, wherein the processor is configured to generate the lighting system analysis indicating the charge storage device is operating normally in response to the charge state being greater than the threshold charge amount.

5. The computing device of claim 1, wherein the processor is configured to connect to a gateway of the facility.

6. The computing device of claim 5, wherein the processor is configured to connect to the lighting device via the gateway.

7. The computing device of claim 5, wherein the processor is configured to communicate with the gateway via an RS-232 communication standard.

8. The computing device of claim 5, wherein the processor is configured to communicate with the gateway via an RS-485 communication standard.

9. The computing device of claim 1, wherein generating the lighting system analysis includes generating a report about the lighting device based on the retrieved lighting information, wherein the report includes the charge state and the amount of life remaining.

10. A system for generating a lighting system analysis, comprising:
    a lighting device in a facility, the lighting device including a charge storage device;
    a gateway; and
    a computing device remotely located from the lighting device, wherein the computing device is configured to:
       connect, via the gateway, to the lighting device of an emergency lighting system of the facility;
       retrieve lighting information about the lighting device including a charge state of the charge storage device of the lighting device, wherein the charge state is a level of charge of the charge storage device relative to a capacity of the charge storage device, and wherein the lighting information is retrieved according to a predetermined schedule that is based on a life age of the lighting device;
       determine, based on the charge state of the charge storage device, a capacity loss of the charge storage device;
       determine, based on the capacity loss, an amount of life remaining in the charge storage device; and
       generate a lighting system analysis for the lighting device based on the retrieved lighting information, wherein the lighting system analysis includes:
          the charge state of the charge storage device; and
          the amount of life remaining in the charge storage device.

11. The system of claim 10, wherein the lighting device further includes a lamp.

12. The system of claim 11, wherein:
    the system further includes a control panel of the facility and an event device of the facility; and
    the control panel is configured to enable the lamp in response to the event device detecting an event occurring in the facility.

13. The system of claim 12, wherein generating the lighting system analysis includes generating a report about the detected event and the lighting device.

14. The system of claim 10, wherein the computing device is configured to retrieve the lighting information during a test mode of the lighting device.

15. A method for generating a lighting system analysis, comprising:
    connecting, by a computing device, to a lighting device of an emergency lighting system of a facility via a gateway of the facility, wherein the lighting device includes a charge storage device and a lamp and the computing device is remotely located from the lighting device;
    retrieving, by the computing device, lighting information about the lighting device, wherein the lighting information includes a charge state of the charge storage device and the charge state is a level of charge of the charge storage device relative to a capacity of the charge storage device, and wherein the lighting information is retrieved according to a predetermined schedule that is based on a jurisdictional requirement of the facility or a life age of the lighting device;
    determining, by the computing device based on the charge state of the charge storage device, a capacity loss of the charge storage device;

determining, by the computing device based on the capacity loss, an amount of life remaining in the charge storage device;

comparing, by the computing device, the charge state to a threshold charge amount; and generating, by the computing device based on the comparison, a lighting system analysis for the lighting device including:
- the charge state of the charge storage device;
- the amount of life remaining in the charge storage device; and
- whether the lighting device has a fault based on the comparison.

16. The method of claim 15, wherein the method includes determining, by the computing device, the lighting device has the fault in response to the charge state being less than the threshold charge amount.

17. The method of claim 16, wherein the method includes generating the lighting system analysis by generating a report indicating the lighting device has the fault.

* * * * *